US009595778B2

(12) United States Patent
Kawamura et al.

(10) Patent No.: US 9,595,778 B2
(45) Date of Patent: Mar. 14, 2017

(54) ELECTRICAL JUNCTION BOX

(71) Applicant: Yazaki Corporation, Tokyo (JP)

(72) Inventors: Hideki Kawamura, Makinohara (JP); Hiroki Tashiro, Makinohara (JP); Takashi Ishibashi, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/632,184

(22) Filed: Feb. 26, 2015

(65) Prior Publication Data
US 2015/0255900 A1    Sep. 10, 2015

(30) Foreign Application Priority Data

Mar. 5, 2014 (JP) .................................. 2014-042846

(51) Int. Cl.
*H01R 12/00* (2006.01)
*H01R 11/28* (2006.01)
(Continued)

(52) U.S. Cl.
CPC ........ *H01R 11/282* (2013.01); *B60R 16/0238* (2013.01); *H01R 11/24* (2013.01); *H01R 11/288* (2013.01); *H01R 2201/26* (2013.01)

(58) Field of Classification Search
CPC .............................. H01R 11/281; Y02E 60/12
(Continued)

(56) References Cited

U.S. PATENT DOCUMENTS 6,679,708 B1 * 1/2004 Depp .................... H01R 9/2466
361/752
7,499,262 B1 * 3/2009 Darr ....................... H01R 9/226
361/626
(Continued)

FOREIGN PATENT DOCUMENTS

CN        101388526 A      3/2009
JP       2009-252453 A     10/2009
(Continued)

OTHER PUBLICATIONS

First Office Action issued by The State Intellectual Property Office of People's Republic of China on Sep. 29, 2016, in corresponding Chinese Patent Application No. 201510098515.4.

*Primary Examiner* — Abdullah Riyami
*Assistant Examiner* — Thang Nguyen
(74) *Attorney, Agent, or Firm* — Locke Lord LLP; Howard M. Gitten

(57) ABSTRACT

An electrical junction box includes a rescue terminal, protruding from a top surface of a box body, and a terminal supporting plate, attached to the rescue terminal. The rescue terminal has a space in its proximity to allow a clip of a booster cable to be connected to the rescue terminal with the clip in a horizontal lying posture. The rescue terminal is also provided with a supporting portion that is to be located under the clip to support the clip. A plurality of relays attached to the box body have top surfaces that constitute the supporting portion. To connect the clip to the rescue terminal, the clip in a horizontal lying posture is brought close to the rescue terminal so as to clamp the rescue terminal and the terminal supporting plate on their sides, with the clip placed on the top surfaces of the relays constituting the supporting portion.

2 Claims, 7 Drawing Sheets

(51) Int. Cl.
*H01R 11/24* (2006.01)
*B60R 16/023* (2006.01)

(58) Field of Classification Search
USPC .................. 439/754, 76.2, 949, 620.27
See application file for complete search history.

(56) References Cited

U.S. PATENT DOCUMENTS

| | | | | |
|---|---|---|---|---|
| 7,785,116 B2* | 8/2010 | Akahori | ............. | B60R 16/0238 439/76.2 |
| 8,162,677 B2* | 4/2012 | Yu | ............. | H01R 9/24 136/244 |
| 8,395,061 B2* | 3/2013 | Asao | ............. | H02G 3/16 174/50 |
| 8,821,190 B2* | 9/2014 | Matsumura | ............. | H01H 85/044 337/186 |
| 9,502,793 B2* | 11/2016 | Iwata | ............. | H01R 9/223 |
| 2003/0064634 A1* | 4/2003 | Fukuda | ............. | H01R 11/282 439/754 |
| 2007/0066149 A1* | 3/2007 | Fujii | ............. | H01R 11/283 439/754 |
| 2008/0200045 A1* | 8/2008 | Akahori | ............. | H01R 13/514 439/76.2 |
| 2009/0233495 A1* | 9/2009 | Sproesser | ............. | H01R 11/282 439/754 |
| 2009/0253311 A1* | 10/2009 | Akahori | ............. | B60R 16/0238 439/709 |
| 2010/0317242 A1* | 12/2010 | Kim | ............. | H01R 11/284 439/754 |
| 2014/0349527 A1* | 11/2014 | Himeno | ............. | H01R 4/54 439/754 |

FOREIGN PATENT DOCUMENTS

| | | | | | |
|---|---|---|---|---|---|
| JP | 2010093955 A | * | 4/2010 | | |
| JP | 2010093955 A | | 4/2010 | | |
| JP | 20100093955 | * | 4/2010 | ............. | H05K 7/026 |

* cited by examiner

ELECTRICAL JUNCTION BOX

BACKGROUND

Technical Field

The present invention relates to an electrical junction box for use in a vehicle mainly to distribute power, and particularly relates to an electrical junction box including a rescue terminal to which a booster cable is connected when a battery is dead.

Related Art

There are various structures for electrical junction boxes for use in a vehicle. For example, a known type of electrical junction box has a structure that includes a rescue terminal, such as an electrical junction box disclosed in JP 2009-252453 A. When a battery of a vehicle is dead, the rescue terminal mounted in the vehicle is connected to a battery of a rescue vehicle with a clip of a booster cable clamping the rescue terminal.

FIG. 7 is a diagram of a conventional electrical junction box, in which a clip of a booster cable is connected to a rescue terminal of the electrical junction box. An electrical junction box 301 includes a rescue terminal 302 and a terminal supporting plate 331. The rescue terminal 302 protrudes from the top surface of a box body 303 to which relays and fuses are attached. The terminal supporting plate 331 is part of the box body 303 and attached to the rescue terminal 302.

The rescue terminal 302 and the terminal supporting plate 331 are clamped by a clip 10 provided at an end of the booster cable. The clip 10, which is in a vertical standing posture, clamps the upper portions of the rescue terminal 302 and the terminal supporting plate 331.

SUMMARY

The electrical junction box 301 including the rescue terminal 302 is problematic in that, due to its structure, the clip 10 of the booster cable clamps the upper portions of the rescue terminal 302 and the terminal supporting plate 331 with the clip 10 in the unstable vertical standing posture, posing a risk of the clip 10 falling and becoming detached when an unexpected external force is applied to the booster cable.

It is therefore an object of the present invention to provide an electrical junction box that allows for connection of a clip of a booster cable to a rescue terminal with the clip in a stable posture and resists detachment of the clip even when an unexpected external force is applied.

A first aspect of the invention is an electrical junction box, including: a box body having a top surface; a rescue terminal protruding from the top surface of the box body and configured to be clamped by a clip of a booster cable, the rescue terminal having a space in proximity to the rescue terminal, the space being configured to allow the clip in a horizontal lying posture to be connected to the rescue terminal; and a supporting portion configured to be located under the clip to support the clip when the clip in the horizontal lying posture is connected to the rescue terminal.

A second aspect of the invention is the electrical junction box according to the first aspect, wherein electronic components attached to the box body have top surfaces that constitute the supporting portion.

A third aspect of the invention is the electrical junction box according to the first and second aspects, wherein the top surface of the box body constitutes the supporting portion.

A fourth aspect of the invention is the electrical junction box according to any one of the first to third aspects, wherein the rescue terminal includes a metallic plate and a metallic rod, the plate protruding upward from the top surface of the box body, the rod protruding horizontally from a surface of the plate, the rod being configured to be clamped by the clip.

In the first aspect of the invention, the rescue terminal has the space in proximity to the rescue terminal, the space being configured to allow the clip in a horizontal lying posture to be connected to the rescue terminal. The supporting portion is also provided which is configured to be located under the clip to support the clip when the clip in the horizontal lying posture is connected to the rescue terminal. This allows for connection of the clip of the booster cable to the rescue terminal with the clip in a stable posture and, thus, the electrical junction box is provided which has the capability of resisting detachment of the clip even when an unexpected external force is applied.

In the second aspect of the invention, since the top surfaces of the electronic components attached to the box body constitute the supporting portion, no special components are required to form the supporting portion.

In the third aspect of the invention, since the top surface of the box body constitutes the supporting portion, no special components are required to form the supporting portion.

In the fourth aspect of the invention, since the rescue terminal includes a metallic plate and a metallic rod, the plate protruding upward from the top surface of the box body, the rod protruding horizontally from the surface of the plate and configured to be clamped by the clip, the electrical junction box provides increased layout flexibility.

DETAILED DESCRIPTION (First Embodiment)

Figure 1:
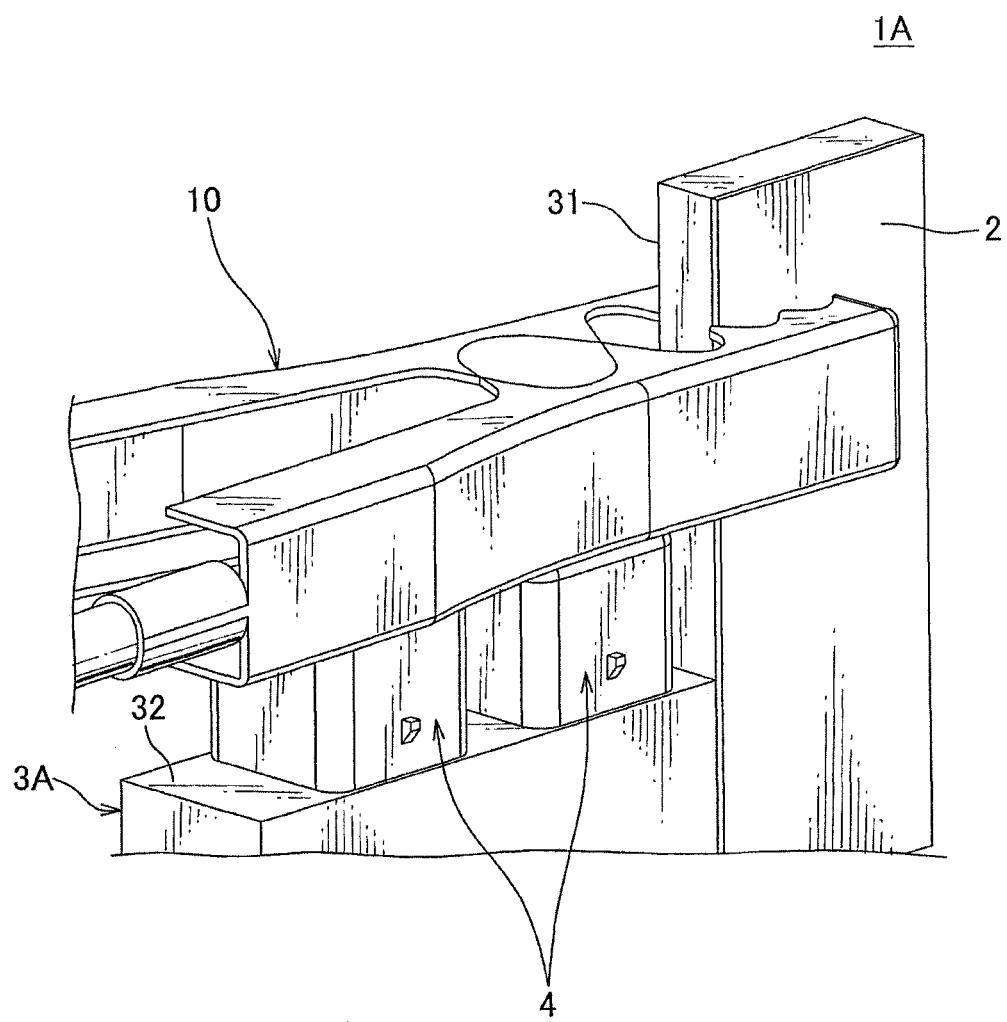
FIG. 1 is a perspective view of an electrical junction box according to a first embodiment of the invention, in which a clip of a booster cable is connected to a rescue terminal of the electrical junction box.
Figure 2:
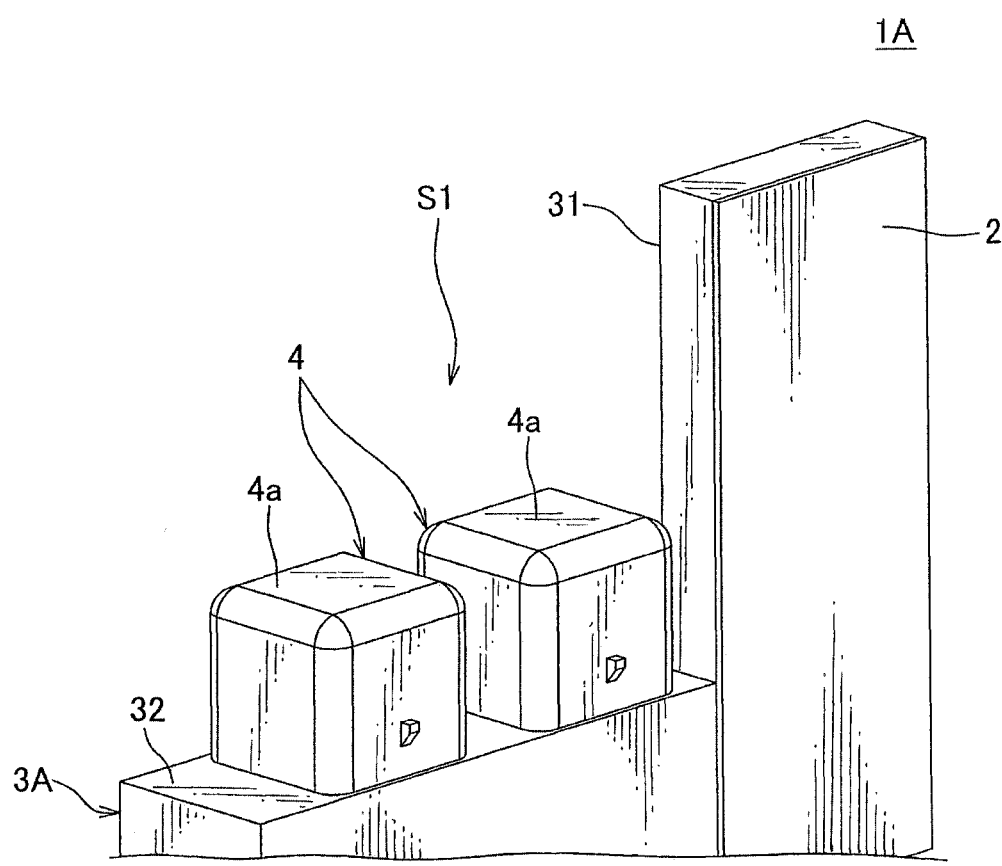
FIG. 2 is a perspective view of the rescue terminal illustrated in FIG. 1 with the clip removed.

An electrical junction box according to a first embodiment of the invention will now be described with reference to FIGS. 1 and 2. An electrical junction box 1A illustrated in FIGS. 1 and 2 is designed for use in a vehicle mainly to distribute power. The electrical junction box 1A includes a rescue terminal 2 and a terminal supporting plate 31. The rescue terminal 2 protrudes from a top surface of a box body 3A and is designed to be clamped by a clip 10 of a booster cable. The terminal supporting plate 31 is attached to the rescue terminal 2.

The box body 3A is made with synthetic resin, and an electronic component, such as a relay and a fuse, an electric wire, a bus bar, and the like are attached to the box body 3A.

The rescue terminal 2 is designed to be electrically connected via the booster cable to a battery in a rescue vehicle when a battery in a vehicle that the electrical junction box 1A is mounted on is dead. The rescue terminal 2 is a metal plate shaped into a narrow strip.

The terminal supporting plate 31 is part of the box body 3A and shaped into a similar shape to the rescue terminal 2 with a larger thickness than the rescue terminal 2. The terminal supporting plate 31 and the rescue terminal 2 are clamped together by the clip 10.

The rescue terminal 2 has a space S1 in its proximity to allow the clip 10 in a horizontal lying posture (FIG. 1) to be connected to the rescue terminal 2.

Additionally, the electrical junction box 1A includes a supporting portion that is to be located under the clip 10 to support the clip 10 when the clip 10 in the horizontal lying posture is connected to the rescue terminal 2. In the present embodiment, a plurality of relays 4 attached to a mounting portion 32 of the box body 3A have top surfaces 4a that constitute the supporting portion.

As illustrated in FIG. 1, to connect the clip 10 of the booster cable to the rescue terminal 2 in the electrical junction box 1A having the structure described above, the clip 10 in a horizontal lying posture is brought close to the rescue terminal 2 so as to clamp the rescue terminal 2 and the terminal supporting plate 31 on their sides, with the clip 10 placed on the top surfaces 4a of the relays 4 constituting the supporting portion. The structure that allows the clip 10 to be connected in such a stable posture to the rescue terminal 2 resists displacement of the clip 10 and detachment of the clip 10 from the rescue terminal 2 even when an unexpected external force is applied to the booster cable.

(Second Embodiment)

Figure 3:
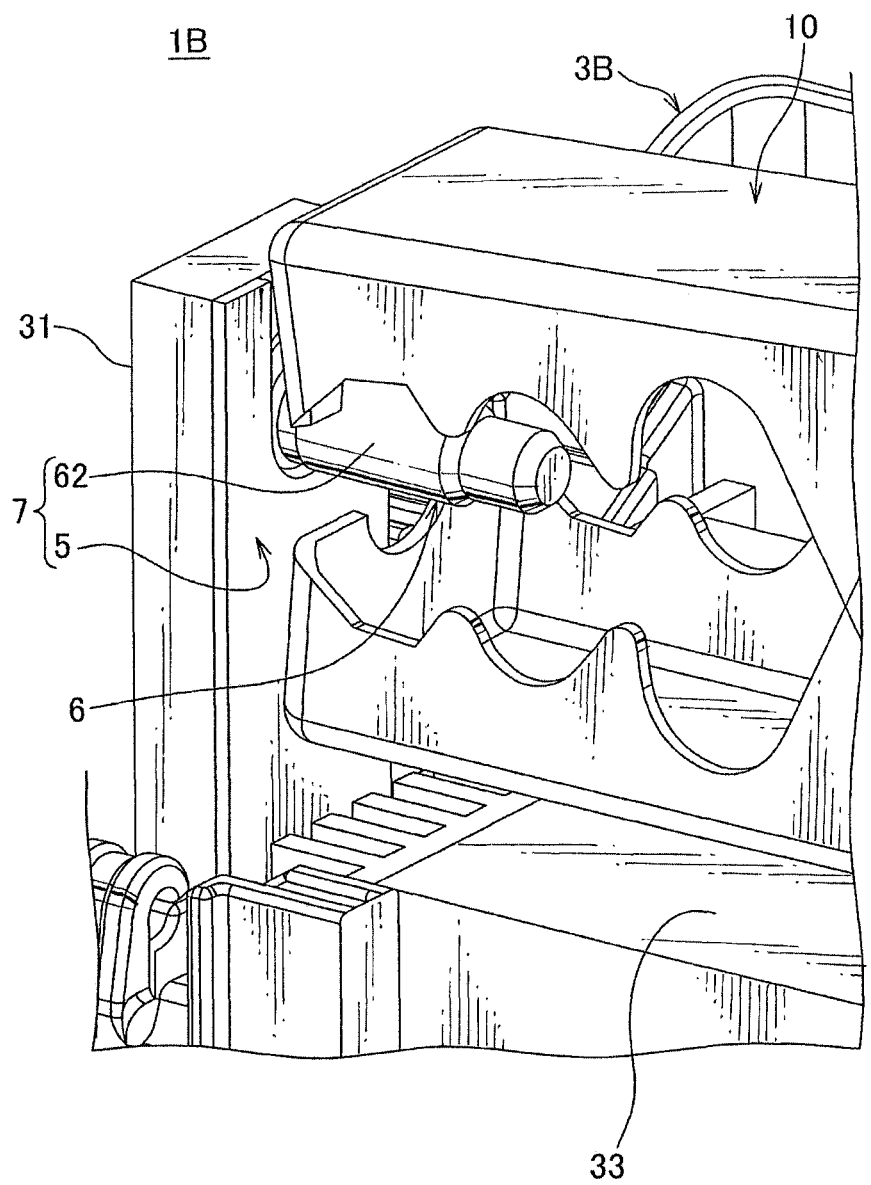
FIG. 3 is a perspective view of an electrical junction box according to a second embodiment of the invention, in which a clip of a booster cable is being connected to a rescue terminal of the electrical junction box.
Figure 4:
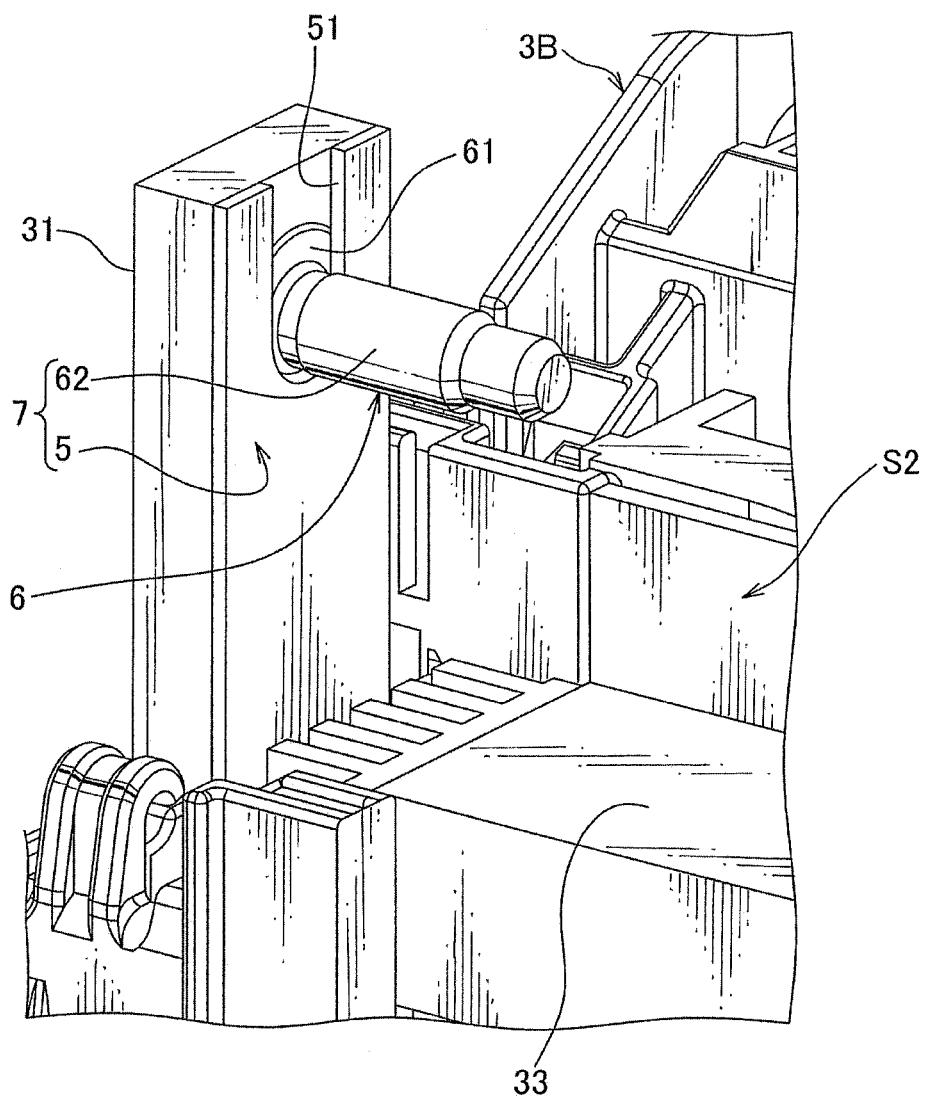
FIG. 4 is a perspective view of the rescue terminal illustrated in FIG. 3 with the clip removed.

An electrical junction box according to a second embodiment of the invention will now be described with reference to FIGS. 3 and 4. In FIGS. 3 and 4, components identical with those in the first embodiment described above are designated with identical reference characters and descriptions thereof are omitted.

An electrical junction box 1B illustrated in FIGS. 3 and 4 includes a rescue terminal 7 and a terminal supporting plate 31. The rescue terminal 7 protrudes from a top surface 33 of a box body 3B made with synthetic resin and is designed to be clamped by a clip 10 of a booster cable. The terminal supporting plate 31 is attached to the rescue terminal 7.

The rescue terminal 7 includes a metallic plate 5 and a metallic rod 62. The plate 5 protrudes upward from the top surface 33 of the box body 3B, and the rod 62 protrudes horizontally from a surface of the plate 5. The plate 5 is shaped into a narrow strip and has a notch 51 at an upper portion of the plate 5. The plate 5 is attached to the terminal supporting plate 31. The rod 62 is part of a bolt 6. The bolt 6 has a head 61 that is attached to the terminal supporting plate 31 through press fit or insert molding, with the rod 62 protruding horizontally from the surface of the plate 5 through the notch 51. The bolt 6 and the plate 5 are in contact with each other and electrically connected with each other. Thus, when the rod 62 is clamped by the clip 10, the booster cable is electrically connected to the plate 5.

The rescue terminal 7 has a space S2 in its proximity to allow the clip 10 in a horizontal lying posture (FIG. 3) to be connected to the rescue terminal 7.

Additionally, the electrical junction box 1B includes a supporting portion that is to be located under the clip 10 to support the clip 10 when the clip 10 in the horizontal lying posture is connected to the rescue terminal 7. In the present embodiment, the top surface 33 of the box body 3B constitutes the supporting portion.

As illustrated in FIG. 3, to connect the clip 10 of the booster cable to the rescue terminal 7 in the electrical junction box 1B having the structure described above, the clip 10 in a horizontal lying posture is brought close to the rescue terminal 7 so as to clamp the rod 62, with the clip 10 placed on the top surface 33 of the box body 3B constituting the supporting portion. The structure that allows the clip 10 to be connected in such a stable posture to the rescue terminal 7 resists displacement of the clip 10 and detachment of the clip 10 from the rod 62 even when an unexpected external force is applied to the booster cable.

(Third Embodiment)

Figure 5:
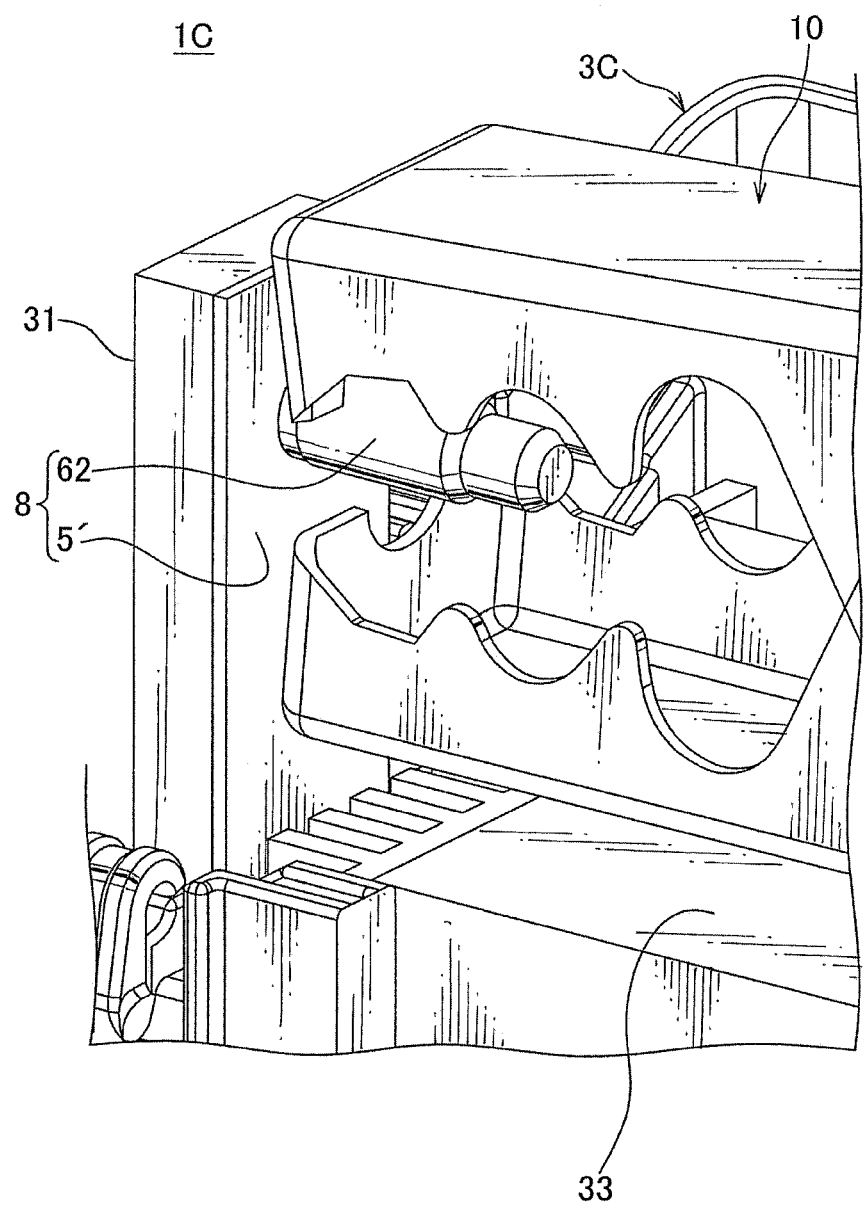
FIG. 5 is a perspective view of an electrical junction box according to a third embodiment of the invention, in which a clip of a booster cable is being connected to a rescue terminal of the electrical junction box.
Figure 6:
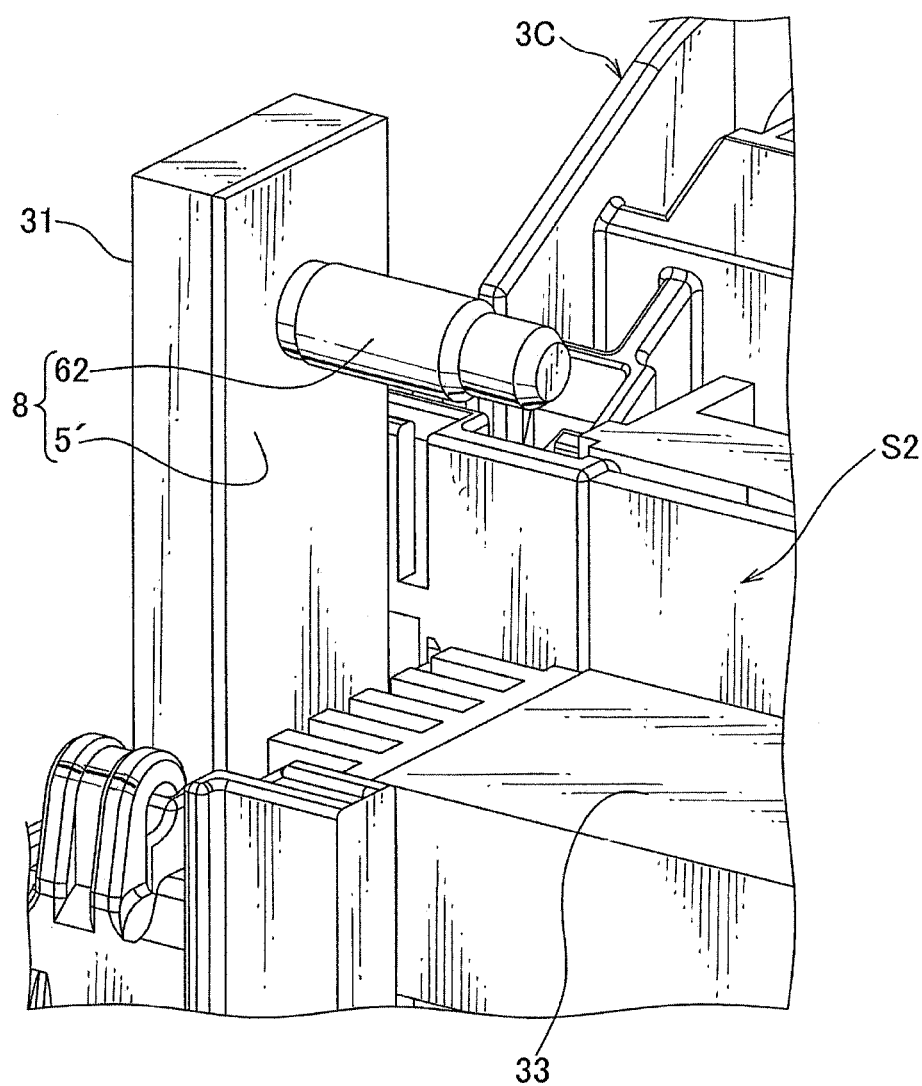
FIG. 6 is a perspective view of the rescue terminal illustrated in FIG. 5 with the clip removed.
Figure 7:
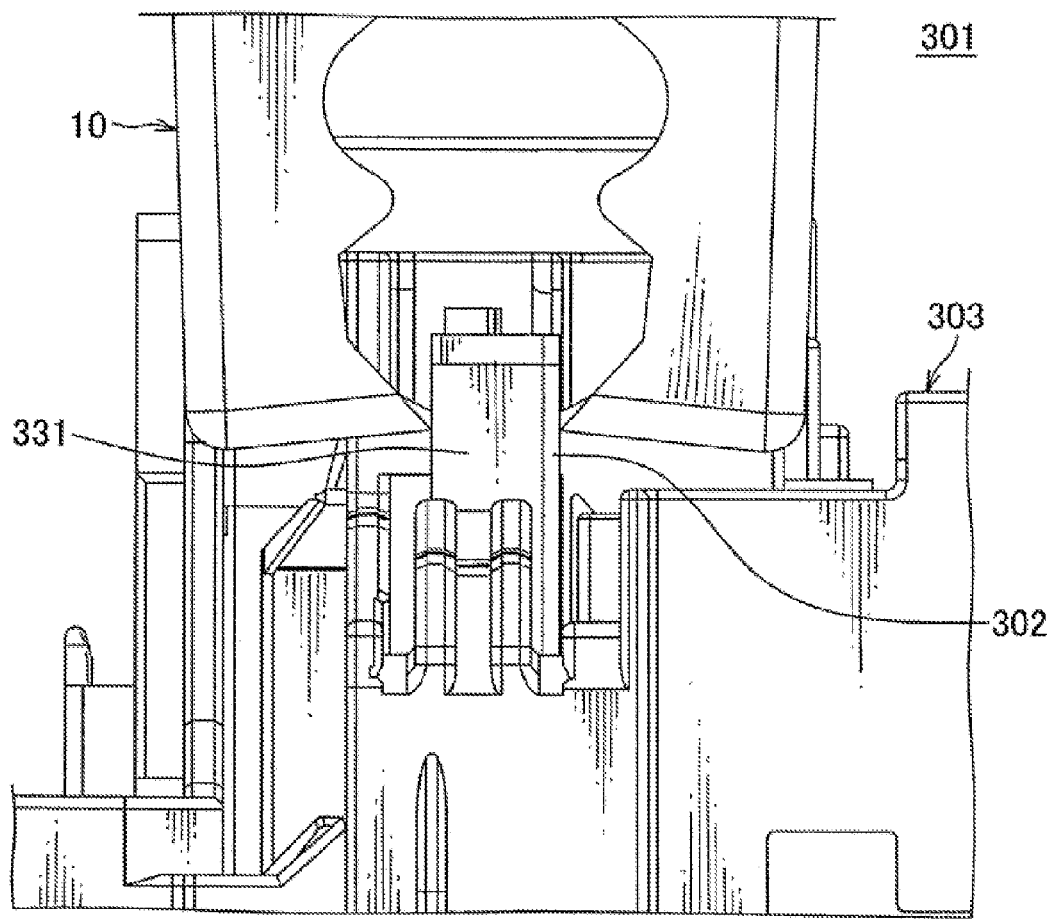
FIG. 7 is a diagram of a conventional electrical junction box, in which a clip of a booster cable is connected to a rescue terminal of the electrical junction box.

An electrical junction box according to a third embodiment of the invention will now be described with reference to FIGS. 5 and 6. In FIGS. 5 and 6, components identical with those in the first and second embodiments described above are designated with identical reference characters and descriptions thereof are omitted.

An electrical junction box 1C illustrated in FIGS. 5 and 6 includes a rescue terminal 8 and a terminal supporting plate 31. The rescue terminal 8 protrudes from a top surface 33 of a box body 3C made with synthetic resin and is designed to be clamped by a clip 10 of a booster cable. The terminal supporting plate 31 is attached to the rescue terminal 8.

The rescue terminal 8 includes a metallic plate 5' and a metallic rod 62. The plate 5' protrudes upward from the top surface 33 of the box body 3C, and the rod 62 protrudes horizontally from a surface of the plate 5'. The plate 5' is shaped into a narrow strip. The plate 5' is attached to the terminal supporting plate 31. The rod 62 is welded onto the plate 5' and electrically connected to the plate 5'. Thus, when the rod 62 is clamped by the clip 10, the booster cable is electrically connected to the plate 5'.

As illustrated in FIG. 5, to connect the clip 10 of the booster cable to the rescue terminal 8 in the electrical junction box 1C having the structure described above, the clip 10 in a horizontal lying posture is brought close to the rescue terminal 8 so as to clamp the rod 62, with the clip 10 placed on the top surface 33 of the box body 3C constituting the supporting portion. The structure that allows the clip 10 to be connected in such a stable posture to the rescue terminal 8 resists displacement of the clip 10 and detachment of the clip 10 from the rod 62 even when an unexpected external force is applied to the booster cable.

It should be noted that the embodiments described above are presented merely as some representative embodiments of the invention and do not limit the invention. The embodiments may be implemented in various modified forms without departing from the spirit of the invention.

What is claimed is:

1. An electrical junction box, comprising:
    a box body having a top surface;
    a rescue terminal protruding from the top surface of the box body and configured to be clamped by a clip of a booster cable, the rescue terminal having a space in proximity to the rescue terminal, the space being configured to allow the clip in a horizontal lying posture to be connected to the rescue terminal; and a supporting portion configured to be located under the clip to support the clip when the clip in the horizontal lying posture is connected to the rescue terminal, wherein electronic components attached to the box body have top surfaces that constitute the supporting portion, the rescue terminal includes a metallic plate and a metallic rod, the metallic plate protruding upward from the top surface of the box body, the metallic rod integrally formed with the metallic plate and protruding horizontally from a surface of the metallic plate, and the metallic rod being configured to be clamped by the clip.

2. An electrical junction box comprising:

a box body having a top surface;

a rescue terminal protruding from the top surface of the box body and configured to be clamped by a clip of a booster cable, the rescue terminal having a space in proximity to the rescue terminal, the space being configured to allow the clip in a horizontal lying posture to be connected to the rescue terminal; and a supporting portion configured to be located under the clip to support the clip when the clip in the horizontal lying posture is connected to the rescue terminal, wherein the top surface of the box body constitutes the supporting portion, the rescue terminal includes a metallic plate and a metallic rod, the metallic plate protruding upward from the top surface of the box body, the metallic rod integrally formed with the metallic plate and protruding horizontally from a surface of the metallic plate, and the metallic rod being configured to be clamped by the clip.

* * * * *